Aug. 24, 1937.  H. S. EBERHARD  2,090,787
POWER TRANSMISSION MECHANISM
Filed April 28, 1933    2 Sheets-Sheet 1
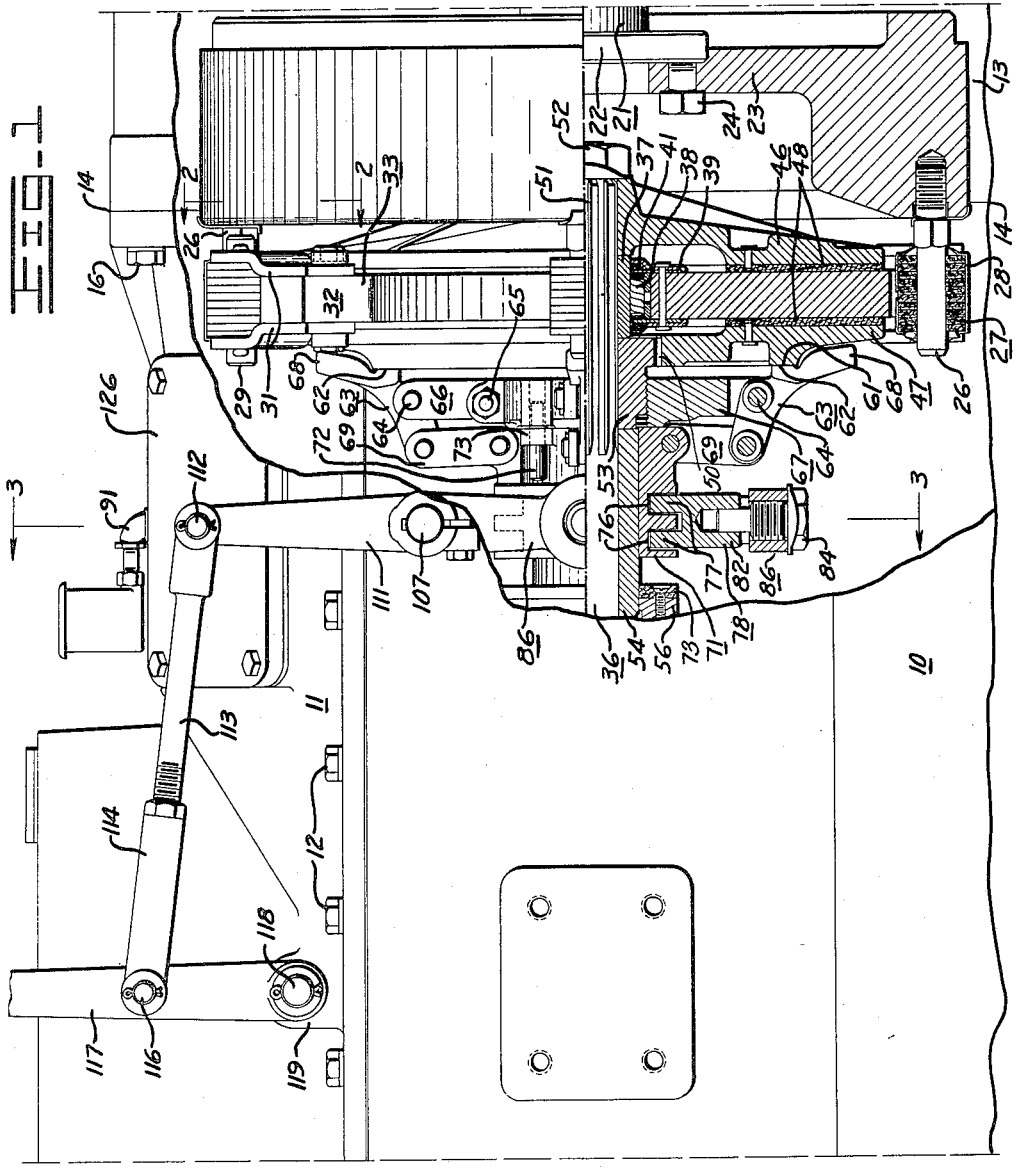
INVENTOR.
Harmon S. Eberhard
ATTORNEY.

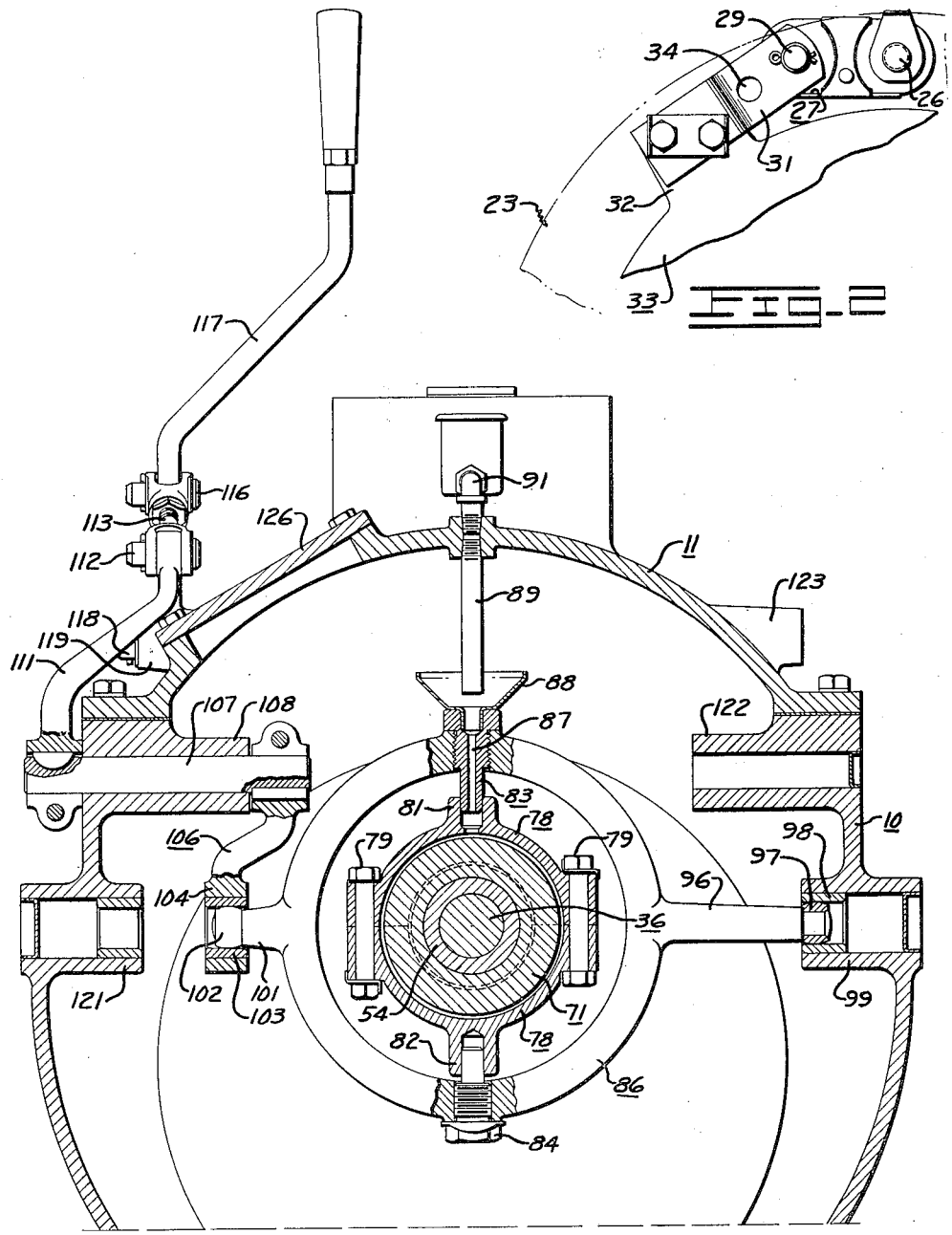

Patented Aug. 24, 1937

2,090,787

UNITED STATES PATENT OFFICE 2,090,787

POWER TRANSMISSION MECHANISM

Harmon S. Eberhard, Peoria, Ill., assignor to Caterpillar Tractor Co., San Leandro, Calif., a corporation of California Application April 28, 1933, Serial No. 668,307

16 Claims. (Cl. 192—68)

Statement of invention

The present invention relates to transmission mechanism, and more particularly to the provision of a novel clutch and clutch control means.

It is an object of the invention to provide a simple, reliable clutch and control means therefor, which can be installed and removed easily.

Another object of the invention is to provide an improved clutch construction which prevents charring or burning of flexible connecting parts thereof which are subject to deterioration by heat, and which are employed to minimize shock and to make unnecessary accurate alignment of certain other members associated with the clutch.

Another object of the invention is to provide a clutch construction including heat-dissipating means for prolonging the life of such flexible parts or elements of the clutch.

Another object of the invention is to provide a clutch including flexible driving connections from the source of power, and heat-dissipating means interposed between the connections and the clutch elements.

Another object of the invention is to provide governor means in a clutch to prevent unintentional self-engagement thereof.

Another object of the invention is to provide a clutch construction having automatically operable means for maintaining the clutch in disengaged position.

Another object of the invention is to provide governed clutch control means adapted to remain in adjusted position during high rotational speeds.

Another object of the invention is to provide a clutch including control means having a floating, pivotal mounting, to insure ease of operation.

Another object of the invention is to provide a clutch including control means having a floating, pivotal mounting on either side of the vehicle, to provide right-hand or left-hand control of the clutch, and to insure ease of operation in either position of the clutch control means.

Another object of the invention is to provide means for mounting clutch control means, to provide right-hand or left-hand operation of the clutch.

Another object of the invention is to provide a vehicle frame having optional stations for mounting clutch control means.

Other objects will appear as the description progresses.

Description of drawings

Fig. 1 is a partial right side elevation of a tractor having a clutch constructed according to the instant invention. The housing enclosing the clutch is broken away to better disclose the clutch, the lower half of which is shown in section.

Fig. 2 is a fragmentary detail view taken on the line 2—2 in Fig. 1.

Fig. 3 is a vertical transverse section taken on line 3—3 in Fig. 1 looking toward the rear end of the tractor.

Description of mechanism

The invention is disclosed as embodied in a tractor of the type having a frame comprising a transmission case and a crankcase joined together. The frame or body portion includes transmission case 10 (Fig. 1) having cover 11 secured thereon by screws 12, and crankcase 13 joined to said case 10 and cover 11 at 14 by screws 16.

The source of power or engine includes crankshaft 21 having integral flange 22 at the rear end thereof to which flywheel 23 is secured by a plurality of screws 24. The clutch is driven from the flywheel by flexible connections including heat dissipating elements which substantially reduce the transmission of heat from the frictionally engaged parts of the clutch to the flexible elements of the connections, thereby preventing burning or charring, and decreasing the deleterious effect of heat on such flexible elements to increase the life of the connections.

Flywheel 23 has a plurality of studs 26 threaded therein to provide means for connecting the flywheel to the driving element of the clutch. Each stud 26 has associated therewith a flexible element 27 (Fig. 2), including a plurality of straps of flexible fabric material subject to deterioration by heat such as leather, for example, secured together by clip 28, each said element 27 being apertured at one end to pass over a stud 26, and at the other end to receive a pin 29. Said pin 29 provides a pivotal connection between said flexible element 27 and spaced shackles 31 (Figs. 1 and 2), which are secured at their other ends on opposite sides of ear 32 on driving clutch element or plate 33, plate 33 having an ear 32 for each connection. Each shackle 31 (Fig. 2) is apertured, as at 34, to reduce the cross-sectional area of shackles 31 intermediate the ends thereof. Because of such reduction in the cross-sectional area of shackles 31, restriction to the flow of any heat through such shackles obtains. Consequently heat which might be generated as a result of relative slipping or dragging of the clutch plates and which would flow through shackles 31 from the clutch plates as its source to the links 27, meets an obstruction to its flow before all of such heat can reach the links 27. This obviously results in the ends of shackles 31 connected to clutch plate 33 being maintained at a higher temperature, than the opposite ends thereof connected to elements or links 27. By virtue of such higher temperature, heat is radiated rapidly from the clutch plate ends of shackles 31 to the surrounding air to be dissipated therein. Such rapid heat dissipation at the clutch plate ends of shackles 31 results in a less quantity of heat being transferred entirely through the metal of shackles 31, than the total quantity of heat which is transferred from the clutch plates to the clutch plate ends of shackles 31. This results in maintaining of such elements 27 relatively cool and preventing charring or burning or other deterioration of such elements. A plurality of such flexible connections are provided at spaced points to connect the flywheel to the driving clutch element. By virtue of the flexible connections, accurate alignment of clutch driven shaft 36 and crankshaft 21 is unnecessary, as a slight misalignment of such shafts will be accommodated by flexing of elements 27. Also, if the clutch should be engaged too quickly, elements 27 will yield slightly to minimize the shock caused by such engagement and prevent any damage to the parts of the transmission or similar mechanism driven by the clutch.

Said plate 33 (Fig. 1) is mounted on the forward end of clutch driven shaft 36 by sleeve 37 and bearing 38, said bearing being held between retainers 39 having sealing rings 41 seated therein and engaging sleeve 37. Plate 33 is shiftable axially on sleeve 37. Said plate 33, comprising the driving clutch element, is positioned between plates 46, 47 comprising the driven clutch elements and having suitable discs 48 riveted thereon to engage said plate 33. Plate 46 is internally splined to engage splined portion 51 of shaft 36, being held thereon by nut 52. Plate 47 is slidably and non-rotatably mounted at 50 on hub 53 also splined on shaft 36, being positioned between sleeve 37 and spacer 54, which is suitably mounted in transmission case 10 by plate 56. Thus, spacer 54, hub 53, sleeve 37, and the hub of plate 46 are held in engagement with each other and in place on shaft 36 by nut 52. As plate 47 is slidable with respect to hub 53, it can be shifted to cause engagement or disengagement of the clutch.

Governed control means are provided to control shifting movement of the shiftable driven clutch element to control engagement of the clutch. Said plate 47 has an integral annular boss 61, which is adapted to be engaged by cam surfaces 62 on a plurality of cam levers 63. Said levers 63 are pivoted on pins 64 in equally spaced, radial arms 66 of spider 67, said spider being threaded on hub 53 whereby adjustment of the clutch can be made. Said spider 67 is slotted radially through one arm 66 which is apertured to receive clamping bolt 65 serving to lock said spider 67 on hub 53. Projecting radially from cam surfaces 62, each cam lever 63 is provided with weighted extension 68 providing unequal weight distribution between the opposite arms of said lever. At its inner end, each lever 63 is pivotally connected to a pair of links 69 which are pivoted at their inner ends to collar 71 mounted on spacer 54. Said collar 71 is connected for rotation with spider 67 by pin 72 threaded into said spider and passing freely through boss 73 on collar 71. To engage the clutch, said collar 71 is shifted to the right (as viewed in Fig. 1) to oscillate cam levers 63 through links 69, urging plate 47 into engagement with plate 33, which is held between and drives plates 46, 47. The clutch-engaging position of collar 71 is illustrated in Fig. 1, and it is to be noted that in this position links 69 are substantially perpendicular to the axis of collar 71, whereby cam levers 63 are maintained firmly in clutch-engaging position. Upon movement of collar 71 to the left, cam levers 63 are oscillated to relieve pressure on plates 47, 33, whereby the clutch is disengaged, collar 71 engaging brake lining 73 on plate 56.

As no positive means is provided for separating plates 33, 46, 47, a certain amount of frictional drag exists, causing rotation of plates 46, 47 and spider 67. When the rotational speed of the driven clutch elements becomes excessive so as to prevent meshing of the transmission gears, cam levers 63, due to the centrifugal force caused by the weight of extensions 68, act as governing means to move collar 71 to the left into engagement with brake lining 73. Thus, the rotational speed of the driven clutch elements is maintained automatically within permissible limits. It is obvious that the governing action of the cam levers not only prevents unintentional self-engagement of the clutch when disengaged by constantly urging cam levers 63 to clutch-disengaging position, but also facilitates disengagement of the clutch with minimum dragging of the clutch plates when the clutch plates are first separated. Thus, the governing action of levers 63 minimizes or substantially eliminates frictional drag between the clutch plates, and minimum heat is consequently generated. Since minimum heat is generated, by virtue of the provision of levers 63, such levers cooperate in providing for minimum heat flow from the clutch plates to the flexible fabric links 27.

Control means are provided for shifting the collar to control engagement or disengagement of the clutch, and, for this purpose, collar 71 has annular grooves 76 which are engaged by projections 77 of opposite collars 78. Said collars 78 (Fig. 3) are secured together by bolts 79, and are provided with opposite apertured bosses 81, 82, which are engaged by screws 83, 84 in yoke 86. Screws 83, 84 and bosses 81, 82 provide vertically aligned pivotal connections from the shift yoke to the shift collar, whereby oscillation of the yoke causes shifting movement of the above-described governed clutch control means. Screw 83 is provided with passage 87 and funnel 88 to receive lubricant from pipe 89 and lubricant fitting 91 mounted in cover 11. Thus, lubricant can be introduced to the bearing surfaces of shift collars 78 and collar 71.

The shift yoke is provided with a pivotal floating mounting which insures ease of operation in controlling the clutch, as no binding occurs between the yoke and the shift collar to which it is connected. Yoke 86 has long arm 96 having roller 97 mounted at the outer end thereof and disposed in bushing 98 in boss 99 in transmission case 10. Opposite arm 96 and aligned therewith is short arm 101 having roller 102 thereon disposed in bushing 103 in boss 104 of lever or crank 106. The upper end of lever 106 is keyed and clamped on the inner end of shaft 107, which is journaled in boss 108 of transmission case 10 and extends therethrough. Oscillation of shaft 107 and crank 106 causes oscillation of yoke 86 about roller 97 as a pivot, said roller 97 sliding within bushing 98 during such pivotal movement. Lever or crank 111, keyed on shaft 107 outside of transmission case 10, is pivotally connected at 112 to rod 113 (Fig. 1), which has threaded engagement with fork 114 pivoted at 116 on hand control lever 117. Said lever 117 is pivoted on shaft 118 in boss 119 (Figs. 1 and 3) of cover 11. It is to be noted that the floating, pivotal mounting of yoke 86 insures operation of the governing means to maintain the clutch disengaged at relatively low rotational speeds thereof.

From the foregoing description, it is obvious that oscillation of hand control lever 117 through a linkage including yoke 114, rod 113, lever 111, shaft 107, lever 106, and yoke 86 serves to shift collar 71 (Fig. 1) to oscillate cam levers 63 to control shifting movement of plate 47. As shown in Fig. 1, the clutch is in engaged position, plate 33 being pressed between plates 46, 47, and collar 71 being shifted to its forward position.

The clutch control means is shown as mounted for right-hand drive or operation. Optional mounting stations are provided in the frame of the tractor, whereby the linkage can be mounted for left-hand drive or operation. For this purpose, the right-hand wall of transmission case 10 (Fig. 3) is provided with boss 121, similar to opposite boss 99, and adapted to receive arm 96 of yoke 86, and the left-hand wall of said case 10 is provided with apertured boss 122, similar to boss 108 in the right-hand wall, adapted to receive shaft 107. Boss 123 on the left side of transmission case cover 11, similar to boss 119 on the right-hand side thereof, is adapted to receive shaft 118 for mounting hand control lever 117 on the left-hand side of the machine. Thus, the clutch control means can be mounted for right-hand drive and optionally for left-hand drive.

Cover 126 (Figs. 1 and 3) on transmission case cover 11 closes an aperture therein providing access to the clutch and clutch control means for disassembly or adjustment thereof.

I therefore, claim as my invention:

1. In a transmission, a source of power including a flywheel, a clutch for selectively transmitting power from said flywheel including a driving clutch element, and connections from said flywheel to said element, each connection including a link of flexible material subject to deterioration by heat secured to said flywheel and a metallic link connecting said first link and said element, said metallic link being formed to dissipate the heat from said element and reduce the flow thereof to said link of flexible material.

2. In a transmission, a source of power including a flywheel, a clutch for selectively transmitting power from said flywheel including a driving clutch element, and connections from said flywheel to said element, each connection including a member subject to deterioration by heat, and heat-dissipating means for reducing the flow of heat from said element to said member, whereby said member is protected from the deleterious effects of the heat.

3. In a transmission, a source of power including a flywheel, a clutch for selectively transmitting power from said flywheel including a driving clutch element, and a connection from said flywheel to said element including a member subject to deterioration by heat, and heat-dissipating means for reducing the flow of heat from said element to said member, whereby said member is protected from the deleterious effects of the heat.

4. In a vehicle, a frame, a clutch, and control means for said clutch including a yoke, a hand lever, and connections from said yoke to said lever, said frame having opposite sets of mounting stations for said yoke, said lever, and said connections, whereby optional right-hand or left-hand drive is provided for the vehicle.

5. In a vehicle, a frame, a clutch, and control means for said clutch including a yoke, a hand lever, and connections from said yoke to said lever, said frame having opposite sets of mounting stations for said yoke, said lever, and said connections, whereby optional right-hand or left-hand drive is provided for the vehicle, the mounting stations for said yoke providing for floating pivotal movement thereof.

6. In a tractor, a source of power, a shaft, a clutch housing, a clutch in said housing for driving said shaft from said source of power, and control means for said clutch, including a movable member, governing means acting to maintain said movable member in clutch disengaging position, and a control member for moving said movable member having a floating mounting in said housing, the floating mounting of said control member insuring operation of said governing means at relatively low rotational speeds of said clutch.

7. In a tractor, a source of power, a shaft, a clutch housing, a clutch in said housing for driving said shaft from said source of power, and control means for said clutch, including a movable member, governing means acting to maintain said movable member in clutch disengaging position, and a control member for moving said movable member, and means providing a floating, pivotal mounting for said control member in any of a plurality of positions in said housing, whereby operation of said governing means at relatively low rotational speeds of said clutch is insured in all mounted positions of said control member.

8. In a clutch, a shaft rotatable about an axis, a driving clutch member mounted for free rotation about said axis and with respect to said shaft, a driven clutch member mounted on said shaft for rotation therewith and for axial shifting movement with respect thereto, said axial shifting movement determining engagement and disengagement of said members, a support member mounted in a fixed position on said shaft for rotation therewith and spaced from said driven member, an element movably mounted on said support member and having a part adapted to contact a face of said driven member to control clutching engagement of said driving and driven members, said element having an unbalanced weight distribution acting under centrifugal force to move said part out of contact with said face, a rotatable collar mounted for shifting movement axially of said shaft and connected to said element to control movement thereof, and brake means engageable with said collar in a shifted position thereof which determines positioning of said element part out of contact with said driven member face.

9. In a clutch driven from a source of power and having a driving member and a driven member engageable with said driving member, a drive connection between said source of power and said driving member including a flexible element subject to deterioration by heat connected to said source of power and means connected between said element and said driving member for minimizing the flow to said element of heat generated by frictional drag between said members, and means cooperable with said driven member for minimizing frictional drag between said members both when the clutch is disengaged and when it is in the act of being disengaged.

10. In a clutch driven from a source of power and having a driving member and a driven member engageable with said driving member, a drive connection between said source of power and said driving member including a flexible element subject to deterioration by heat connected to said source of power and link means connected between said element and said driving member, said link means having an intermediate portion of smaller cross-sectional area than the portion thereof connected to said driving member to minimize the flow to said element of heat generated by frictional drag between said members, and means cooperable with said driven member for minimizing frictional drag between said members both when the clutch is disengaged and when it is in the act of being disengaged.

11. In a transmission, a source of power, a clutch for selectively transmitting power from said source of power including a driving clutch element, and a connection from said source of power to said driving element including a link of material subject to deterioration by heat and means connected between said link and said driving element to minimize the flow to said link of heat generated by frictional drag in said clutch.

12. In a transmission, a source of power, a clutch for selectively transmitting power from said source of power including a driving clutch element, and a connection from said source of power to said driving element including a link of material subject to deterioration by heat and link means connected between said link and said driving element, said link means having an intermediate portion of smaller cross-sectional area than the portion thereof connected to said driving element to minimize the flow to said link of heat generated by frictional drag in said clutch.

13. In a power transmitting mechanism; a source of power; a clutch for selectively transmitting power from said source and including engageable and disengageable members; and a shock absorbing and misalignment compensating connection between said source of power and said clutch comprising a flexible element connected to said source of power, said element being of material subject to deterioration by heat which would be generated by frictional drag between said clutch members, and means connected between said element and said clutch to minimize flow of said heat to said element.

14. In a power transmitting mechanism, a source of power; a clutch for selectively transmitting power from said source and including engageable and disengageable members; and a shock absorbing and misalignment compensating connection between said source of power and said clutch comprising a flexible element connected to said source of power, said element being of material subject to deterioration by heat which would be generated by frictional drag between said clutch members, and a heat dissipating member connected between said element and said clutch to minimize flow of said heat to said element.

15. In a power transmitting mechanism; a source of power; a clutch for selectively transmitting power from said source and including engageable and disengageable members; and a shock absorbing and misalignment compensating connection between said source of power and said clutch comprising a flexible element connected to said source of power, said element being of material subject to deterioration by heat which would be generated by frictional drag between said clutch members, and a heat dissipating member connected between said element and said clutch and having an intermediate portion of smaller cross-sectional area than the portion thereof connected to said clutch to minimize flow of said heat to said element.

16. In a power transmitting mechanism; a source of power; a clutch for selectively transmitting power from said source and including engageable and disengageable members; and a shock absorbing and misalignment compensating connection between said source of power and said clutch comprising a flexible element connected to said source of power, said element being of material subject to deterioration by heat which would be generated by frictional drag between said clutch members, means connected between said element and said clutch to minimize flow of said heat to said element; and means associated with said clutch and automatically operable under the action of centrifugal force when said clutch members are disengaged for urging said members to disengaged position to minimize said frictional drag.

HARMON S. EBERHARD.